US010499051B2

United States Patent
Abe

(10) Patent No.: US 10,499,051 B2
(45) Date of Patent: Dec. 3, 2019

(54) DISPLAY DEVICE PROVIDED WITH VIDEO DISPLAY UNIT, AND METHOD FOR MEASURING DISPLAY OF VIDEO DISPLAY UNIT

(71) Applicant: NEC Display Solutions, Ltd., Tokyo (JP)

(72) Inventor: Masatoshi Abe, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/761,727

(22) PCT Filed: Oct. 16, 2015

(86) PCT No.: PCT/JP2015/079331
§ 371 (c)(1),
(2) Date: Mar. 20, 2018

(87) PCT Pub. No.: WO2017/064810
PCT Pub. Date: Apr. 20, 2017

(65) Prior Publication Data
US 2018/0352218 A1     Dec. 6, 2018

(51) Int. Cl.
*H04N 17/04* (2006.01)
*G09G 5/00* (2006.01)
*G09G 3/20* (2006.01)

(52) U.S. Cl.
CPC .......... *H04N 17/04* (2013.01); *G09G 3/2092* (2013.01); *G09G 5/00* (2013.01); *G09G 5/003* (2013.01); *G09G 2320/0233* (2013.01); *G09G 2320/041* (2013.01); *G09G 2320/048* (2013.01); *G09G 2320/0626* (2013.01);
(Continued)

(58) Field of Classification Search
CPC ........ G09G 3/2092; G09G 5/00; G09G 5/003; G09G 2320/0233; G09G 2320/041; G09G 2320/048; G09G 2320/0626; G09G 2320/0666; G09G 2320/0693; G09G 2330/02; G09G 2330/12; G09G 2360/145; G09G 2360/16; G09G 2380/08; H04N 17/04
See application file for complete search history.

(56) References Cited

FOREIGN PATENT DOCUMENTS

| CN | 1841161 A | 10/2006 |
| CN | 101536074 A | 9/2009 |

(Continued)

OTHER PUBLICATIONS

Translation of FR2861174 A3, Mizuguchi Tsutomu, Apr. 2005 (Year: 2005).*

(Continued)

*Primary Examiner* — Nelson M Rosario
(74) *Attorney, Agent, or Firm* — McGinn IP Law Group, PLLC.

(57) ABSTRACT

A display device includes: a video display unit, an optical detection unit that measures the display realized by the video display unit; and a control unit that, upon receiving a measurement start time at which the optical detection unit carries out measurement, turns on the power source of the video display unit a first predetermined time interval before the measurement start time, and causes the optical detection unit to perform the measurement at the measurement start time.

9 Claims, 9 Drawing Sheets

(52) U.S. Cl.
CPC ........... *G09G 2320/0666* (2013.01); *G09G 2320/0693* (2013.01); *G09G 2330/02* (2013.01); *G09G 2330/12* (2013.01); *G09G 2360/145* (2013.01); *G09G 2360/16* (2013.01); *G09G 2380/08* (2013.01)

(56) References Cited

FOREIGN PATENT DOCUMENTS

| | | | | | |
|---|---|---|---|---|---|
| FR | 2861174 | A3 | * | 4/2005 | ............ G01J 1/42 |
| JP | S 64-006866 | A | | 1/1989 | |
| JP | H09-198007 | A | | 7/1997 | |
| JP | H09198007 | A | * | 7/1997 | ............ G09G 3/20 |
| JP | 2002-325267 | A | | 11/2002 | |
| JP | 3101147 | U | | 6/2004 | |
| JP | 2008-116737 | A | | 5/2008 | |
| JP | 2008-168044 | A | | 7/2008 | |
| TW | M267449 | U | | 6/2005 | |

OTHER PUBLICATIONS

Translation of JP H09198007 A, Morimoto Kenji, Jul. 1997 (Year: 1997).*
International Search Report (ISR) (PCT Form PCT/ISA/2010), in PCT/JP2015/079331, dated Jan. 12, 2016.
Chinese Office Action, dated Sep. 20, 2019, in Chinese Application No. 201580083809.8 and English Translation thereof.

* cited by examiner

[Fig. 1]
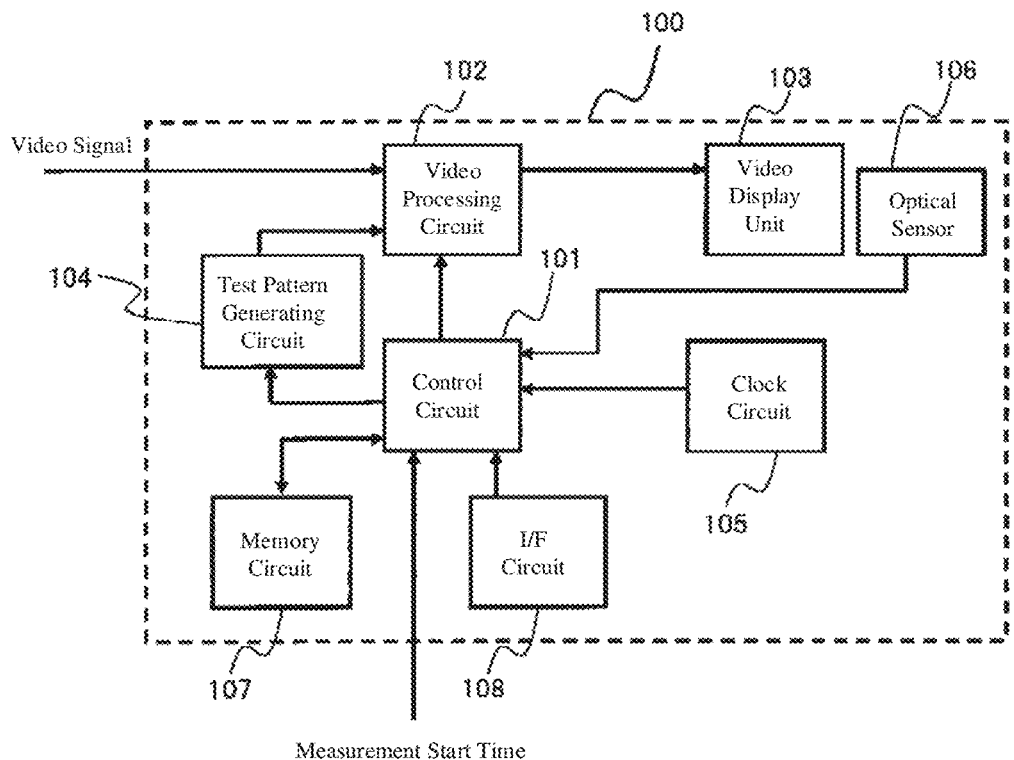
Measurement Start Time
[Fig. 2]
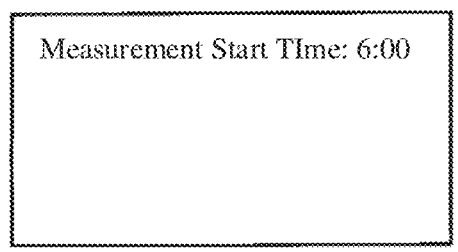

[Fig. 3]
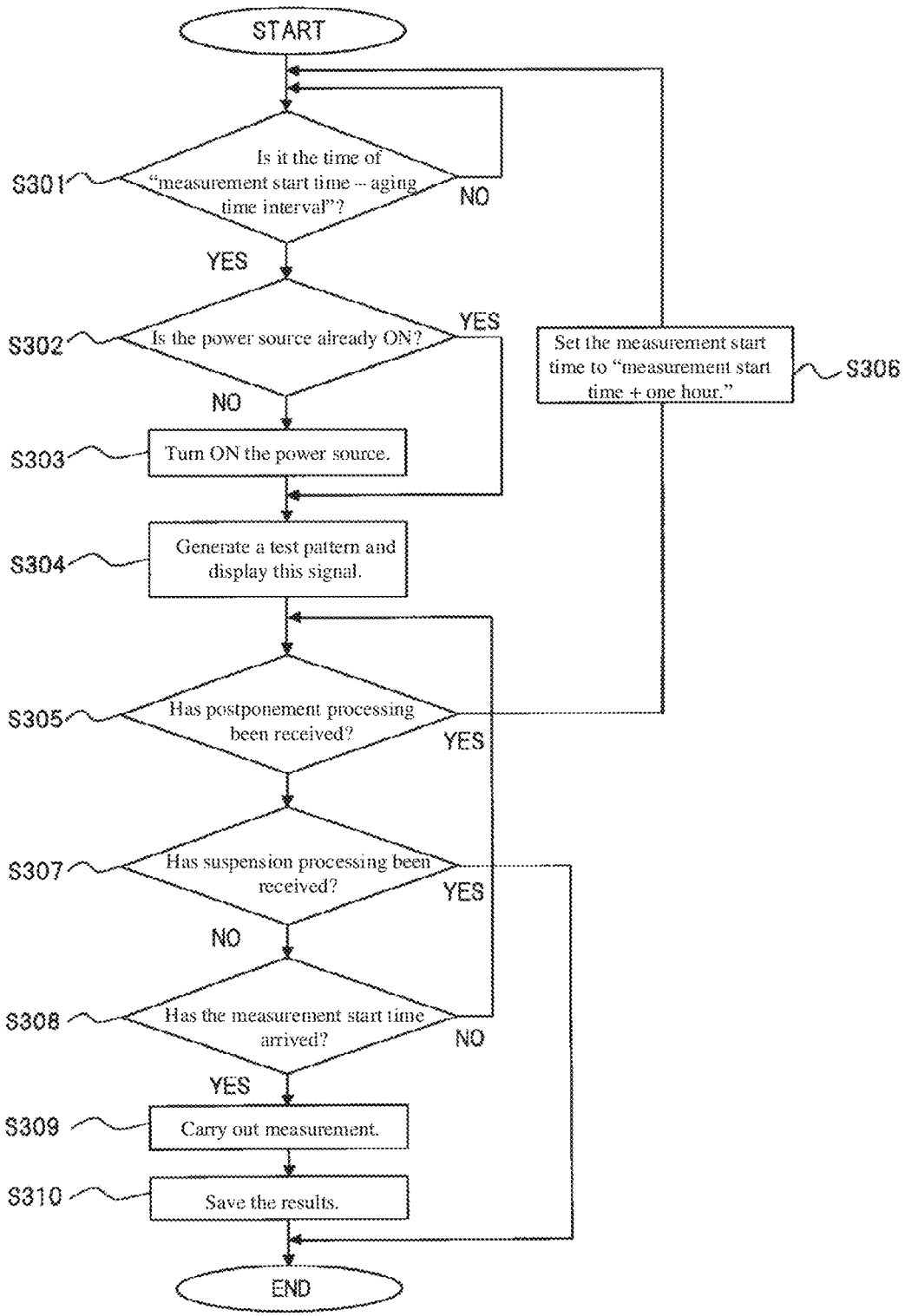

[Fig. 4]
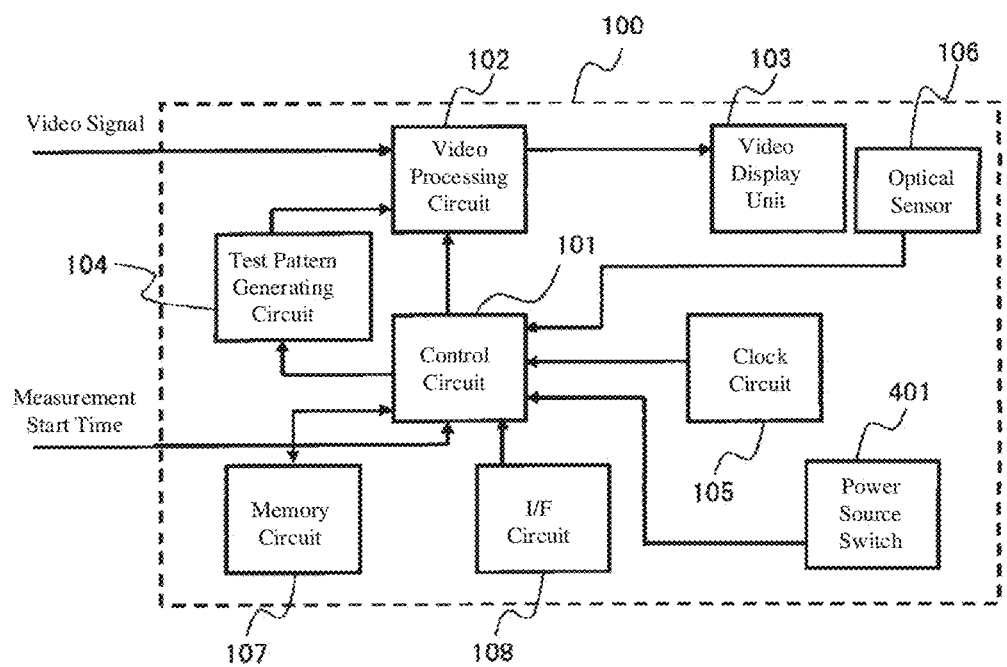

[Fig. 5]
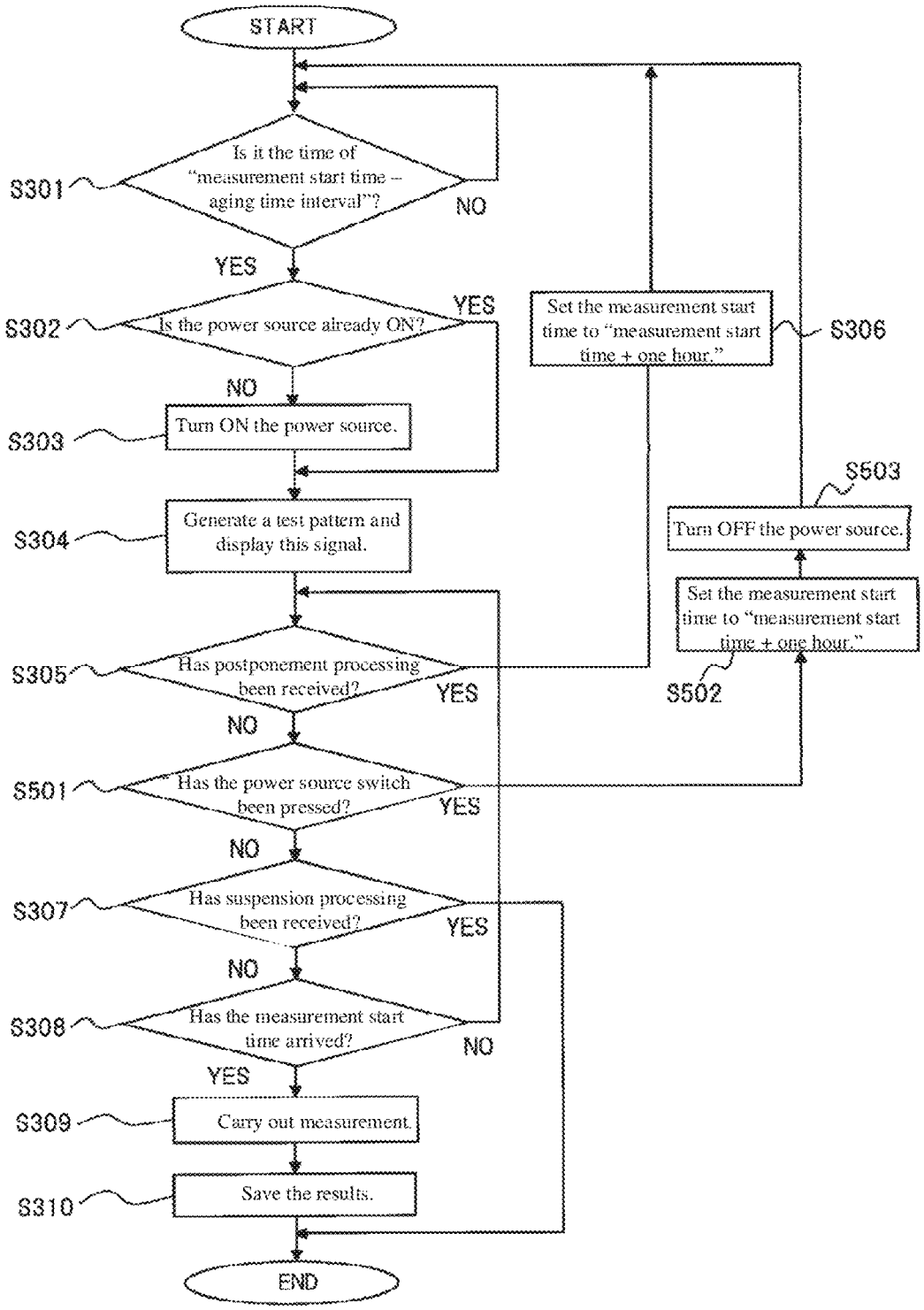

[Fig. 6]
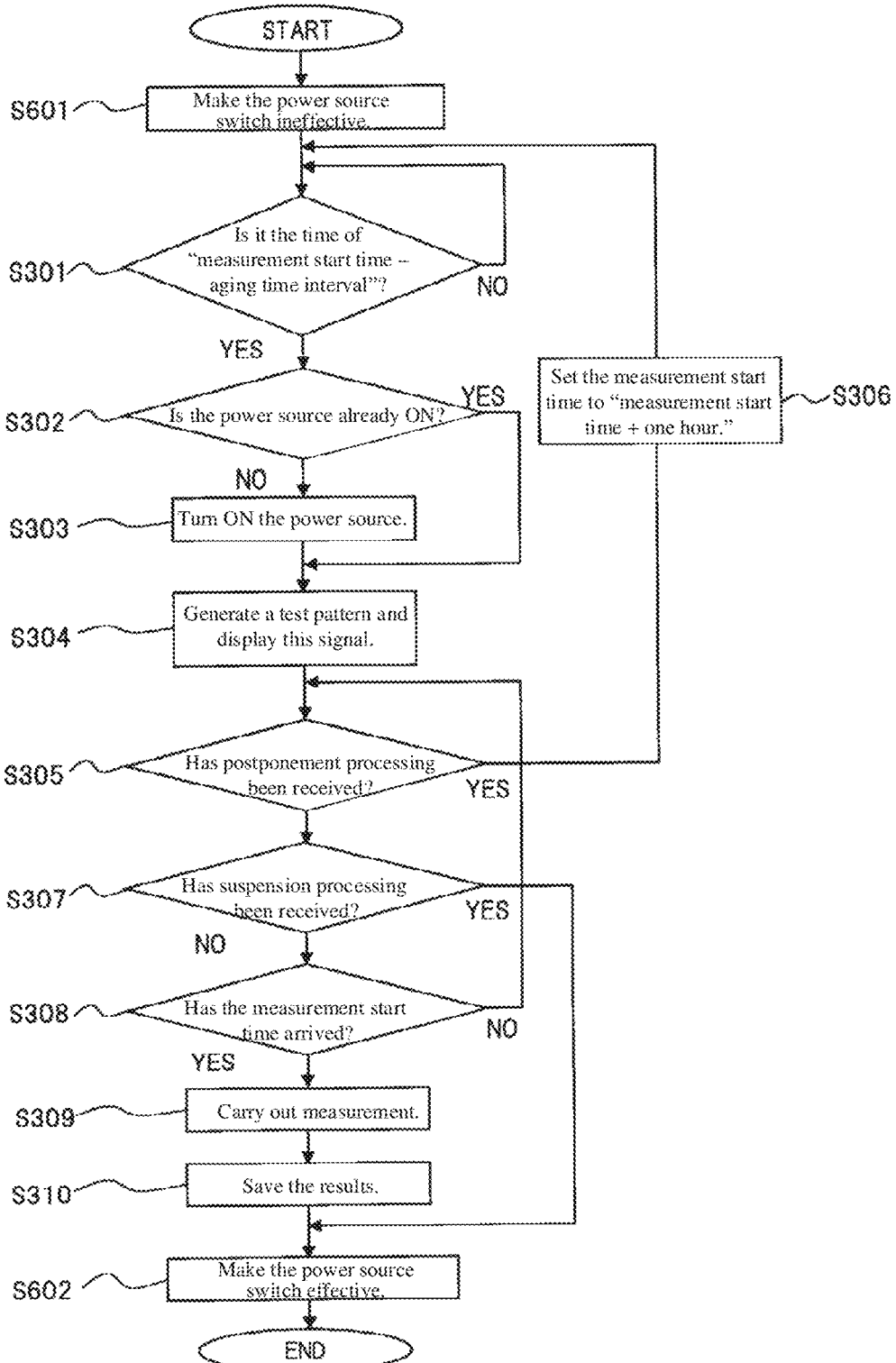

[Fig. 7]

1: Measurement start time: Saturday at 6:10
2: Measurement start time: Every day at 6:30

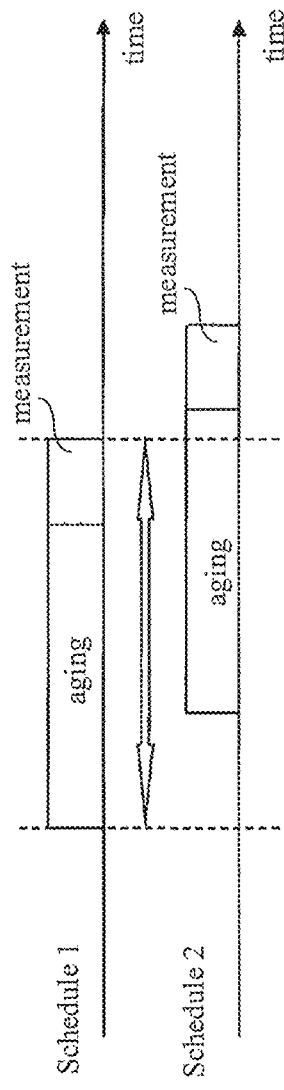
[Fig. 8]

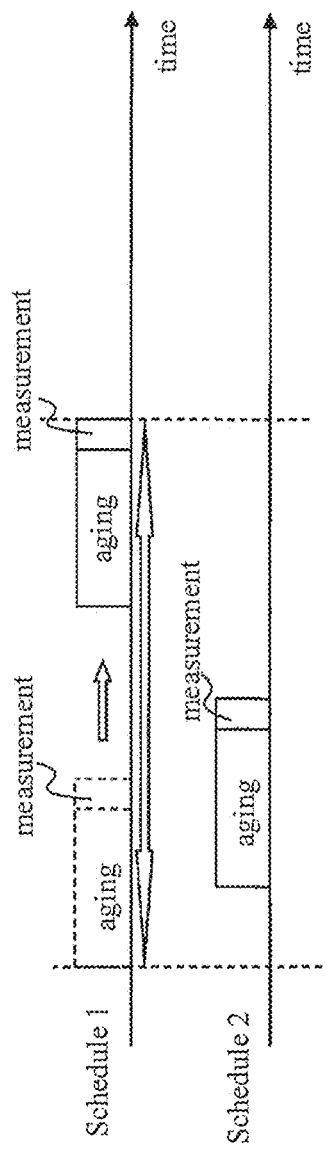
[Fig. 9]

[Fig. 10]
1: Measurement start time: Saturday at 6:10 Measurement
2: Measurement start time: Every day at 6:30 Adjustment
[Fig. 11]
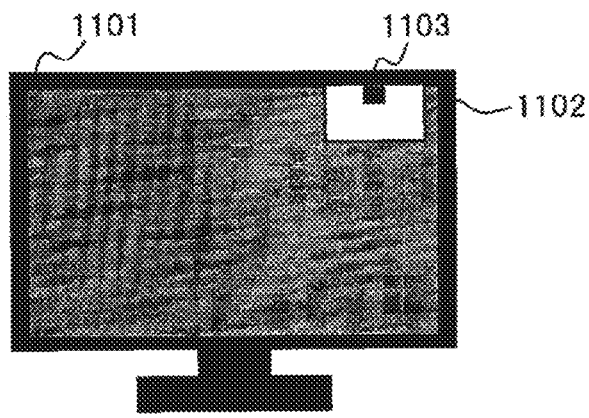

DISPLAY DEVICE PROVIDED WITH VIDEO DISPLAY UNIT, AND METHOD FOR MEASURING DISPLAY OF VIDEO DISPLAY UNIT

TECHNICAL FIELD

The present invention relates to a display device, and more particularly to a display device provided with the function of measuring luminance and chromaticity of displayed images.

BACKGROUND ART

The correct and stable display of luminance and chromaticity is of utmost importance in high-luminance and high-definition display devices used in, for example, systems for performing medical diagnoses or systems for carrying out graphic design.

In particular, a medical diagnosis system requires regular confirmation that the display device is in a display state appropriate for diagnosis. Verification of the display state of a display device is performed by measuring a test pattern that is displayed on the display device (for example, refer to Patent Document 1: Japanese Unexamined Patent Application Publication No. 2008-168044).

In a measurement, measurement pattern 1102 is displayed on the display screen of display device 1101 as shown in FIG. 11, measurement pattern 1102 that is displayed is measured by optical sensor 1103 that is arranged on the display screen of display device 1101, and the result then saved.

LITERATURE OF THE PRIOR ART

Patent Documents

Patent Document 1: Japanese Unexamined Patent Application Publication No. 2008-168044

DISCLOSURE OF THE INVENTION

Problem to be Solved by the Invention

As shown in FIG. 11, the measurement of a display device is carried out in a state in which optical sensor 1103 is arranged on the display screen of display device 1101. Display device 1101 performs display that accords with a video signal that is supplied from a host device that is a constituent element of the system, but a user of the system is unable to adequately check the display when optical sensor 1103 is on the display screen and is therefore not able to use the system. As a result, the measurement of the display device is carried out when the system is not being used, such as at night, so as not to interfere with normal operation.

On the other hand, in a high-luminance and high-definition display device, measurement must be carried out after performing aging to sufficiently warm up and stabilize the device. In the case of a liquid crystal display device, the change in temperature of the liquid crystal panel or backlight is extreme immediately following powering-up, and this change is a factor in changes in luminance and chromaticity. In this state, the luminance and chromaticity may change even when the same image is being displayed. As a result, when measurement is to be carried out, aging of approximately 30 minutes should be performed beforehand.

As described hereinabove, measurement is carried out during a time slot in which the system is not being used, but having an operator perform the time-consuming work that accompanies the aging operation during this time becomes problematic.

Further, non-use cannot be guaranteed even during a time in which the system is not normally being used. Nevertheless, it is still crucial that the measurement be performed reliably and accurately.

The present invention realizes a display device that allows reliable and accurate measurement to verify that luminance and chromaticity are being displayed correctly and with stability.

Means for Solving the Problem

The display device according to the present invention includes:
a video display unit;
an optical detection unit that measures display realized by the video display unit; and
a control unit that, upon receiving a measurement start time at which the optical detection unit carries out measurement, turns ON the power source of the video display unit a first predetermined time interval before the measurement start time, and causes the optical detection unit to carry out measurement at the measurement start time.

The method for measuring the display of a video display unit according to the present invention is a method of measuring the display of a video display unit that is carried out in a display device provided with a video display unit, an optical detection unit that measures display realized by the video display unit, and a control unit; the method includes:
the control unit, upon receiving a measurement start time at which the optical detection unit carries out measurement, causing the power source of the video display unit to turn ON a first predetermined time interval before the measurement start time and then causing the optical detection unit to carry out measurement at the measurement start time.

Effect of the Invention

The display device of the present invention that is provided with the above-described configuration enables the reliable and accurate performance of measurement for verifying that luminance and chromaticity are being correctly and stably displayed.

BRIEF DESCRIPTION OF THE DRAWINGS

FIG. 1 is a block diagram showing the configuration of the first example embodiment of the display device according to the present invention.

FIG. 2 shows an OSD screen that is displayed in a portion of video display unit 103 in the example embodiment shown in FIG. 1.

FIG. 3 is a flow chart showing the measurement operation of the example embodiment shown in FIG. 1.

FIG. 4 is a block diagram showing the configuration of the second example embodiment of the display device according to the present invention.

FIG. 5 is a flow chart showing the operation of the example embodiment shown in FIG. 4.

FIG. 6 is a flow chart showing the operation of the example embodiment shown in FIG. 4.

FIG. 7 shows an OSD screen in which a plurality of schedules are displayed.

FIG. 8 shows the implementation state when a plurality of schedules have been set.

FIG. 9 shows the implementation state when a plurality of schedules have been set.

FIG. 10 shows an OSD screen on which a plurality of schedules are displayed.

FIG. 11 shows the measurement state of the display device.

EXAMPLE EMBODIMENTS (First Example Embodiment)

Example embodiments of the present invention are next described with reference to the accompanying drawings.

FIG. 1 is a block diagram showing the configuration of the first example embodiment of the display device according to the present invention.

Display device 100 shown in FIG. 1 includes: control circuit 101 that is a control unit; video processing circuit 102 that is a video processing unit; video display unit 103; test pattern generating circuit 104 that is a test pattern generating unit; clock circuit 105 that is a clock unit; optical sensor 106 that is an optical detection unit; memory circuit 107 that is a memory unit; and interface (I/F) circuit 108 that is an interface unit.

Together with a host device, display device 100 is a constituent element of a medical diagnosis system and receives as input from the host device a video signal and a measurement start signal that indicates a measurement start time. The video signal is received in video processing circuit 102 and the measurement start signal is received in control circuit 101. I/F circuit 108 is provided in display device 100 itself as an input unit that receives input of a system user. I/F circuit 108 may also be provided with a reception unit that receives a signal from a remote control, and may receive the input of the system user by way of remote control.

Control circuit 101 is connected to clock circuit 105 and memory circuit 107, supplies a control signal to video processing circuit 102 and test pattern generating circuit 104, and receives a detection signal from optical sensor 106.

Memory circuit 107 stores the content of an operating program of control circuit 101 and control circuit 101 carries out a control operation in accordance with the operating program that is stored in memory circuit 107. Memory circuit 107 further stores the results of measurement.

Test pattern generating circuit 104, upon receiving from control circuit 101 a test pattern control signal that indicates that a test pattern is to be generated, generates a test pattern and supplies the test pattern to video processing circuit 102.

Apart from the above-described video signal from the host device and the test pattern from test pattern generating circuit 104, a video control signal from control circuit 101 is also applied as input to video processing circuit 102.

The video control signal indicates to video processing circuit 102 an image that is to be displayed on video display unit 103, and video processing circuit 102, in accordance with the content of the video control signal, brings about the display of the video signal and test pattern that were received as input, and further, generates a video signal of the content that causes an OSD (On-Screen Display) to be displayed on video display unit 103 and supplies the video signal to video display unit 103.

Video display unit 103 displays an image in accordance with the video signal that was supplied from video processing circuit 102. Video display unit 103 is made up of, for example, a liquid crystal panel that is a display element and a light source that irradiates light to the liquid crystal panel. In addition, video display unit 103 does not require a light source when a spontaneous light-emitting display element is used.

Optical sensor 106 measures the test pattern that is displayed on a portion of video display unit 103 as shown in FIG. 11 and supplies the result to control circuit 101.

Clock circuit 105 supplies control circuit 101 with a time signal that indicates the time.

FIG. 2 shows the OSD screen that is displayed on a portion of video display unit 103 in the present example embodiment. The measurement start time is set in the host device by a system user. When the measurement start time has been set, the host device reports the measurement start time to the display device. The measurement start time that is displayed on the OSD screen is set to the measurement start time indicated by the measurement start signal that was received as input from the host device.

Measurement of the display state of the display device is started at the measurement start time. Control circuit 101 receives as input a time signal that indicates the current time from clock circuit 105. Control circuit 101 causes optical sensor 106 to start measurement upon arrival of the measurement start time.

FIG. 3 is a flow chart showing the measurement operation of the present example embodiment. The operation of the present example embodiment is next described with reference to FIG. 1 as well as FIG. 3.

By checking the time signal from clock circuit 105, control circuit 101 verifies whether the time has arrived that is 30 minutes (the aging time), which is the first predetermined time interval, before the measurement start time (Step S301). When it has been verified in Step 5301 that it is 30 minutes before the measurement start time (Step S302), control circuit 101 verifies whether the power source of video display unit 103 is in the ON state (Step S302), transitions to Step 5304 if the power source of video display unit 103 is in the ON state, and when the power source of video display unit 103 is not ON, sets the ON state (Step S303) and transitions to Step 5304.

In Step S304, the display of a test pattern and OSD is implemented as shown below.

Control circuit 101 sends a test pattern control signal for causing the generation of a test pattern to test pattern generating circuit 104 and thus causes the generation of a test pattern. This test pattern is sent to video processing circuit 102. Control circuit 101 both causes video processing circuit 102 to supply the test pattern to video display unit 103 and sends a video control signal for displaying the OSD. A signal for displaying the test pattern and the OSD is thus sent to video display unit 103 and the test pattern and OSD are displayed. In this way, a signal can be applied as input to video display unit 103 and displayed, and video display unit 103 can undergo aging, even when an input video signal is not received.

The OSD described above is for displaying to the user of the system that aging is now in process in order to carry out measurement and that measurement can be postponed or suspended, and is displayed as shown below.

"Please press SW1 to suspend measurement."

"Please press SW2 to postpone the start of measurement."

Switches SW1 and SW2 are provided on I/F circuit 108 but may also be provided on the host device.

After Step S304, verification of whether the postponement process has been initiated (Step S305), whether the suspension process has been initiated (Step S307), or whether the measurement start time has arrived (Step S308) is carried out by monitoring the pressed state of switches SW1 and SW2. If it is verified in Step S305 that switch SW1 has been pressed, the measurement start time is taken as the current measurement start time to which one hour, which is the second predetermined time interval, is added (Step S306), the process returns to Step S301, and the above-described operation is repeated.

When it is verified in Step S307 that switch SW2 has been pressed, the process is ended.

Upon verifying by means of the time signal from clock circuit 101 that the measurement start time has been reached, control circuit 101 causes optical sensor 106 to carry out the measurement of the luminance and chromaticity (luminance and/or chromaticity) of white/black/red/green/blue and halftone colors of each of the colors (predetermined colors and/or half tones of each of the colors) that are displayed as a test pattern (predetermined image) (Step S309), saves the measurement results that are sent from optical sensor 106 in memory circuit 107 (Step S310), and then ends the operation.

In the above-described example embodiment, the measurement start time was set on the basis of a measurement start signal that is received from the host device, but a configuration is also possible in which the measurement start time is set on the basis of the input of a measurement start time to I/F circuit 108. For example, a system user applies a setting start of the measurement start time by way of I/F circuit 108. Control circuit 101 displays on video display unit 103 an OSD prompting the input of a measurement start time. The system user enters a measurement start time by way of I/F circuit 108. I/F circuit 108 supplies a measurement start signal that indicates the measurement start time that was entered to control circuit 101. Control circuit 101 sets the measurement start time on the basis of the measurement start signal that was received as input. Control circuit 101 uses the time signal from clock circuit 105 to start aging when the aging start time has been reached and causes optical sensor 106 to start measurement at the measurement start time.

Further, in the above-described example embodiment, control circuit 101 was described as a component that verifies the aging start time or measurement start time by means of a time signal from clock circuit 105, but control circuit 101 may also be configured to control clock circuit 105 such that an alarm signal is sent at a measurement start time or aging start time in concert with the input of a measurement start time to I/F circuit 108.

In addition, although a case was described in which measurement results are saved in memory circuit 107, measurement results that are saved in memory circuit 107 may also be subsequently displayed on an OSD. Still further, a configuration is also possible that allows the retrieval of measurement results that are stored in memory circuit 107 by an outside application of a portable terminal. By means of this type of configuration, the measurement results can be easily checked by a system user.

In the display device of the present example embodiment having the above-described configuration, when the measurement start time, that has been set beforehand, is reached, measurement of the display state is carried out in a state in which aging has been completed, and reliable and highly accurate measurement can therefore be carried out.

In addition, the postponement or suspension of a measurement is also possible if a situation arises of in which the system is to be used in a time slot in which measurement has been set, and this provision allows flexibility according to the usage conditions of the system.

In a case in which measurement is postponed or suspended to use the system, because the display device was in the process of aging, it can be immediately used in the state of its inherent display characteristics.

A configuration is also possible in which the suspension process or postponement process described above takes a form in which the system user that has checked the OSD applies input to I/F circuit 108 as described in the present example embodiment, or may be of a form in which, for example, a human sensor is provided, and postponement or suspension occurs when the human sensor detects a person during the interval from the start (time) of aging until the start (time) of measurement. In this case, the suspension or the postponement caused by the human sensor may be made settable by the system user. When set to suspend, a signal corresponding to the detection of a person that is supplied from the human sensor is a signal indicating that measurement is to be suspended. When postponement is set, a signal corresponding to the detection of a person that is supplied from the human sensor is a signal indicating that measurement is to be postponed. The human sensor may be a sensor that detects objects, or that, for example, upon detecting the presence of an object within a predetermined range in front of the display unit, determines that the detected object is a person and thus operates.

In addition, in the case of postponement, because the aging time interval is originally set for the purpose of warming up components such as the video display unit, the aging time interval can be abbreviated if sufficient warm-up can be verified. In other words, even when the postponement process has been initiated, measurement may be started with the status of sufficient aging if the power has been supplied for at least a sufficient aging time interval. More specifically, processing proceeds with aging taken as "0" in Step S301 in the flow chart shown in FIG. 3, and the process of Step S308 proceeds as "YES."

However, once the power source has been cut off, the video display unit cools, and aging is preferably carried out from the start again. Further, although the time interval is the controlling factor of sufficient aging in the preceding explanation, a temperature sensor (not shown) may be provided in the interior, and the control of sufficient aging is then realized according to temperature. In this case, it should be determined whether the temperature is saturated or not. The judgment of whether the temperature is saturated may be verified if the amount of change in temperature in a predetermined time interval is not greater than a predetermined value.

Although it was described that the measurement start time is checked by the OSD and set by I/F circuit 108, a communication line (not shown in the figure) may also be provided in display device 100, and the usage start time then set in an application from, for example, a PC.

Although one hour was taken as the postponement time interval, it is not necessary to limit the time interval to one hour and the user may also be allowed to set the postponement time interval.

If the result of the measurement that is carried out in Step S309 indicates that the display state is poor, control circuit 101 may adjust the display state of video display unit 103 and save the measurement results and adjustment results in memory circuit 107. Adoption of this configuration allows use in the proper display state when the system user uses the display device.

Further, a configuration may also be adopted that allows the system user to set the quality of the display state as displayed on an OSD according to the measurement results.

In FIG. 1, a test pattern has been generated and aging is being implemented, but in a case in which a signal is already being received, the received signal may also be displayed without generating the test pattern.

A time that is checked by the OSD and set by I/F circuit 108 has been taken as the measurement start time but may also be taken as the aging start time. When carrying out the above-described adjustment, this time is preferably taken as the adjustment time.

(Second Example Embodiment)

The second example embodiment of the present invention is next described.

FIG. 4 is a block diagram showing the configuration of the second example embodiment of the display device according to the present invention.

The configuration of display device 100 of the present example embodiment is similar to the configuration shown in FIG. 1. The present example embodiment is a device that controls operation relating to the power source switch not shown in FIG. 1, and FIG. 4 therefore specifically shows power source switch 401.

The present example embodiment assumes that a system user mistakenly places the power source switch 401 of display device 100 in the OFF state during aging and is directed toward dealing with this situation.

Placing power source switch 401 in the OFF state means a power source OFF state in which power is not being supplied to video display unit 103 of display device 100.

When a system user presses power source switch 401, control circuit 101 is able to determine that the system user has pressed power source switch 401 by the input of a power source switch signal, that is supplied by power source switch 401, to control circuit 101.

For example, at the time that display device 100 is displaying the image indicated by a video signal that was sent in from the host device, control circuit 101 is able to drop the power supply of display device 100 when power source switch 401 is pressed and a power source switch signal is applied as input, and further, when there is no power supply of display device 100, control circuit 101 is able to commit the power supply of display device 100 when power source switch 401 is pressed and a power source switch signal applied as input.

FIG. 5 is a flow chart showing the operation of the present example embodiment, and Steps S501-S503 are added to the flow chart shown in FIG. 3.

In the present example embodiment, verification of whether a postponement process has been received (Step S305), verification of whether a suspension process has been received (Step S307), and verification of whether power source switch 401 has been pressed (Step S501) are all carried out at the stage at which aging has started.

When it is verified that power source switch 401 has been pressed in Step S501, the measurement start time is set to a time obtained by adding one hour, which is the third predetermined time interval, to the current measurement start time (Step S502), the power source is set to the OFF state (Step S503), and the process returns to Step S301 and the above operation repeated.

If it is not verified that power source switch 401 has been pressed in Step S501, the process is the same as shown in FIG. 3. Although the third predetermined time interval is described as being one hour, identical to the second predetermined time interval in the above-described operation, these time intervals need not be identical and may be set freely.

By means of the above-described operations, measurement is started after the measurement start time has been postponed even when the system user has set power source switch 401 in the OFF state.

In addition, although the power source was described as being in the OFF state once in the above-described example embodiment, by making the power source switch ineffective at the start time of measurement (Step S601) and then making the power source switch effective at the measurement end time (Step S602) as shown in the flow chart of FIG. 6, the user can be prevented from mistakenly turning OFF the power source.

In addition, the handling of a case is next examined in which, rather than the erroneous activation of power source switch that is provided in a display device, the power supply plug is pulled from the outlet.

At the measurement start time of Step S304 of FIG. 3, a measurement state flag is set as a measurement start and stored in memory circuit 107, and the measurement state flag at the time of saving the results of Step S308 is set as measurement completed and stored in memory circuit 107.

During the above-described interval, pulling the power supply plug from the outlet results in an interruption midway in the flow chart shown in FIG. 3, but when the power supply plug is subsequently inserted into the outlet, memory circuit 107 is checked, and if the measurement state flag is written as a measurement start, a process identical to a case of "measurement start time—aging time interval," i.e., the operation that follows Step S302, is carried out, whereby aging can be started from this time point and measurement can be carried out.

When the above-described operation is to be carried out, even should the power supply plug be pulled from the outlet in the midst of aging and measurement, measurement can be started when the power supply is again introduced and the possibility of forgetting measurement is eliminated.

In addition, even when the power supply plug is pulled from the outlet before the time of "measurement start time—aging time interval," by storing in memory circuit 107 a flag indicating whether the measurement that was set in FIG. 2 was completed or not, the time indicated by clock circuit 105 can be compared with "measurement start time—aging time interval," and if that time has already passed, and moreover, if measurement has still not taken place, the measurement can be realized by proceeding to the process that follows Step S302.

(Third Example Embodiment)

In the first example embodiment, a case was described in which postponement or suspension was implemented by a system user during an aging or a measurement operation, but the present example embodiment regards the operation for a case in which the operations according to a plurality of set measurement schedules conflict.

As shown in FIG. 7, "Saturday at 6:10" is designated as measurement schedule 1 and "every day at 6:30" is designated as measurement schedule 2.

FIG. 8 shows the transition of times of aging and measurement of schedule 1 and schedule 2, and when a time slot occurs in which the aging and measurement operations according to the two schedules overlap, the operation according to the schedule that was set for an earlier time is activated, and the processes of aging and measurement are carried out according to the flow chart shown in FIG. 3. After the measurement process according to schedule 1 that was set for an earlier time is completed, the program of schedule 2 is checked, and if the schedules overlap, the process according to schedule 2 is skipped. This procedure is followed because performing two same measurements at about the same time is pointless.

As shown in FIG. 9, in a case in which measurement according to a prearranged time of schedule 1 has been postponed, if schedule 2 is prearranged in the interval up to the time of completion after postponement, the process is skipped as in the above-described case.

In addition to the forms described above, when a plurality of schedules overlap in the total time from preparation up to completion, it is also possible to assign priority according to schedule numbers having a lower number and then implement only processes having higher priority.

Alternatively, it is also possible to allow the user to set the order of priority of schedules.

Still further, when the functions that are to be executed by schedule can be selected, processes may be given priority for implementation according to the functions to be executed. In FIG. 10, the performance of "measurement" on Saturday at 6:10 is designated as measurement schedule 1 and the performance of "adjustment" every day at 6:30 is designated as measurement schedule 2. In the case of the present example embodiment, "adjustment" is considered to have higher priority, and as a result, only schedule 2 is implemented.

EXPLANATION OF THE REFERENCE NUMBERS

100 display device
101 control circuit
102 video processing circuit
103 video display unit
104 test pattern generating unit
105 clock circuit
106 optical sensor
107 memory circuit
108 I/F circuit
401 power source switch

What is claimed is:

1. A display device comprising:
a video display unit;
an optical detection unit that measures display realized by said video display unit; and
a control unit that, upon receiving a measurement start time at which said optical detection unit carries out measurement, turns ON a power source of said video display unit a first predetermined time interval before said measurement start time, and causes said optical detection unit to carry out measurement at said measurement start time,
wherein said control unit, upon verifying input indicating that measurement is to be postponed in an interval from a predetermined time to said measurement start time, takes as the measurement start time the current measurement start time to which a second predetermined time interval is added, said predetermined time being earlier than said measurement start time by said first predetermined time interval.

2. The display device as set forth in claim 1, wherein said control unit, upon verifying input indicating postponement of measurement in an interval after the power source of said video display unit has been turned ON until said measurement start time, takes as the measurement start time the current measurement start time to which a second predetermined time interval is added.

3. The display device as set forth in claim 1, wherein said control unit, upon verifying input indicating suspension of measurement in an interval after the power source of said video display unit has been turned ON until said measurement start time, suspends measurement.

4. The display device as set forth in claim 1, further comprising a power source switch;
wherein said control unit, upon verifying that said power source switch was pressed in the interval after the power source of said video display unit was turned ON until said measurement start time, takes as the measurement start time the current measurement start time to which a third predetermined time interval is added.

5. The display device as set forth in claim 1, further comprising a power source switch;
wherein said control unit makes said power source switch ineffective during the interval from said first predetermined time interval before said measurement start time until said measurement is completed.

6. The display device as set forth in claim 1, wherein said control unit adjusts the display state of said video display unit according to the result of said measurement.

7. The display device as set forth in claim 1, wherein:
said control unit, upon receiving a plurality of said measurement start times, turns ON the power source of said video display unit said first predetermined time interval before the measurement start time that is set in the earlier measurement start time and implements measurement, and does not implement measurement for an intervening measurement start time.

8. A display device comprising:
a video unit:
an optical detection unit that measures display realized by said video display unit: and
a control unit that, upon receiving a measurement start time at which said optical detection unit carries out measurement, turns ON a power source of said video display unit a first predetermined time interval before said measurement start time, and causes said optical detection unit to carry out measurement at said measurement start time,
wherein said control unit, upon verifying input indicating that measurement is to be suspended in an interval from a predetermined time to said measurement start time, suspends measurement, said predetermined time being earlier than said measurement start time by said first predetermined time interval.

9. A method for measuring the display of a video display unit that is carried out in a display device provided with a video display unit, an optical detection unit that measures display realized by said video display unit, and a control unit, the method comprising:
said control unit, upon receiving a measurement start time at which said optical detection unit carries out measurement, causing a power source of said video display unit to turn ON a first predetermined time interval before said measurement start time and then causing said optical detection unit to carry out measurement at said measurement start time;
wherein said control unit, upon verifying input indicating that measurement is to be postponed in an interval from a predetermined time to said measurement start time, takes as the measurement start time the current measurement start time to which a second predetermined time interval is added, said predetermined time being earlier than said measurement start time by said first predetermined time interval.

\* \* \* \* \*